United States Patent
Wang

(10) Patent No.: US 11,343,438 B1
(45) Date of Patent: May 24, 2022

(54) INSTANT AUTO EXPOSURE CONTROL WITH MULTIPLE CAMERAS

(71) Applicant: Advanced Micro Devices, Inc., Santa Clara, CA (US)

(72) Inventor: Po-Min Wang, Hsinchu (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/215,552

(22) Filed: Mar. 29, 2021

(51) Int. Cl.
H04N 5/235 (2006.01)

(52) U.S. Cl.
CPC .................. *H04N 5/2353* (2013.01)

(58) Field of Classification Search
CPC .................................................. H04N 5/2353
See application file for complete search history.

(56) References Cited

U.S. PATENT DOCUMENTS

| | | | |
|---|---|---|---|
| 8,146,821 B2 | 4/2012 | Barkan et al. | |
| 10,057,499 B1 | 8/2018 | Chen et al. | |
| 10,200,599 B1* | 2/2019 | Baldwin | H04N 5/23216 |
| 2020/0077031 A1* | 3/2020 | Lee | H04N 5/2258 |
| 2020/0244895 A1 | 7/2020 | Guerin et al. | |

OTHER PUBLICATIONS

Kremens et al., "System Implications of Implementing Auto-Exposure on Consumer Digital Cameras", Proceedings of SPIE—The International Society for Optical Engineering, Mar. 1999, 8 pages, Version 2.0, https://www.cis.rit.edu/~rikpci/PDFs/ei99_Final.pdf. [Retrieved Jan. 19, 2021].

Shim et al., "Gradient-based Camera Exposure Control for Outdoor Mobile Platforms", IEEE Transactions on Circuits and Systems for Video Technology, Jun. 13, 2018, 14 pages, Version 3, https://arxiv.org/pdf/1708.07338.pdf. [Retrieved Jan. 19, 2021].

Shim et al., "Gradient-based Camera Exposure Control for Outdoor Mobile Platforms", 67 pages, https://drive.google.com/file/d/1XrqEn3DOF8_-KTDnVhxUknF0nQJ8QTiK/view. [Retrieved Jan. 19, 2021].

* cited by examiner

*Primary Examiner* — Ahmed A Berhan
(74) *Attorney, Agent, or Firm* — Kowert Hood Munyon Rankin and Goetzel PC; Rory D. Rankin

(57) ABSTRACT

An apparatus and methods for efficiently determining a final exposure level of an image capture device are described. A first camera generates a first image of a scene based on a first exposure level. A second camera generates a second image of the scene based on a second exposure level. When the first camera determines the first image includes out of range exposure, the first camera adjusts the first exposure level based on the second exposure level of the second camera. Additionally, the first camera adjusts the second exposure level of the second camera based on the second exposure level. Afterward, each of the first camera and the second camera are able to generate new images of the same scene using the updated first exposure level and updated second exposure level.

20 Claims, 8 Drawing Sheets

INSTANT AUTO EXPOSURE CONTROL WITH MULTIPLE CAMERAS

BACKGROUND

Description of the Relevant Art

Both still cameras and a video cameras capture optical images of a particular scene, and these images are converted into electrical signals such as digital data. For example, the camera includes an image sensor that captures the optical image and converts this information into analog electrical signals. An analog-to-digital converter (ADC) converts the analog electrical signals into digital electrical signals. Components of the camera or external components are capable of compressing the digital data, storing the digital data, and editing the digital data. Prior to performing these operations, the components of the camera attempt to capture a high quality image for the user.

Although in some cases, a user purposely performs over- or underexposure of a scene or creates freezing or blurring of a captured image for a particular effect, typically, users prefer a captured image of a scene with highly visible details that are properly lighted. For example, the objects in the scene are easily discernible in the captured image when the digital data is rendered and presented on a display for viewing. One of the many factors that contribute to capturing a detailed and clear image is exposure. Exposure is the amount of light per unit area reaching a frame of the surface of photographic film or an electronic image sensor of a digital camera. The amount of light per unit area is adjusted based on shutter speed (or exposure time) and lens aperture (or size of the aperture of the camera lens that allows light to enter the camera). The amount of light per unit area is also adjusted based on ISO sensitivity (or the sensitivity toward light of the photographic film or digital image sensor of the camera), and luminance of the scene that contains the one or more objects being photographed. The luminance of the scene is the amount of light being reflected from the one or more objects.

The camera's exposure determines how light or dark an image will appear when the image is captured, rendered and output on a display for the user to view. When one or more objects are initially overexposed, the one or more objects appear very bright or white. In contrast, when one or more objects are initially underexposed, the one or more objects appear very dark or black. Rather than rely on the user to determine the particular exposure, many cameras provide an automatic method executed by hardware for finding the particular exposure. This automatic method is referred to as "auto exposure" or "AE." The auto exposure methods of cameras have a trade-off between speed of brightness adjustments and smoothness. Aggressive auto exposure methods provide higher speed, but with a cost of little smoothness that provides discomforting preview images to the user. On the other hand, conservative auto exposure methods provide high smoothness that is pleasing to the user glancing at preview images, but with a cost of low speed.

In view of the above, methods and mechanisms for efficiently determining a final amount of camera exposure are desired.

Figure 1:
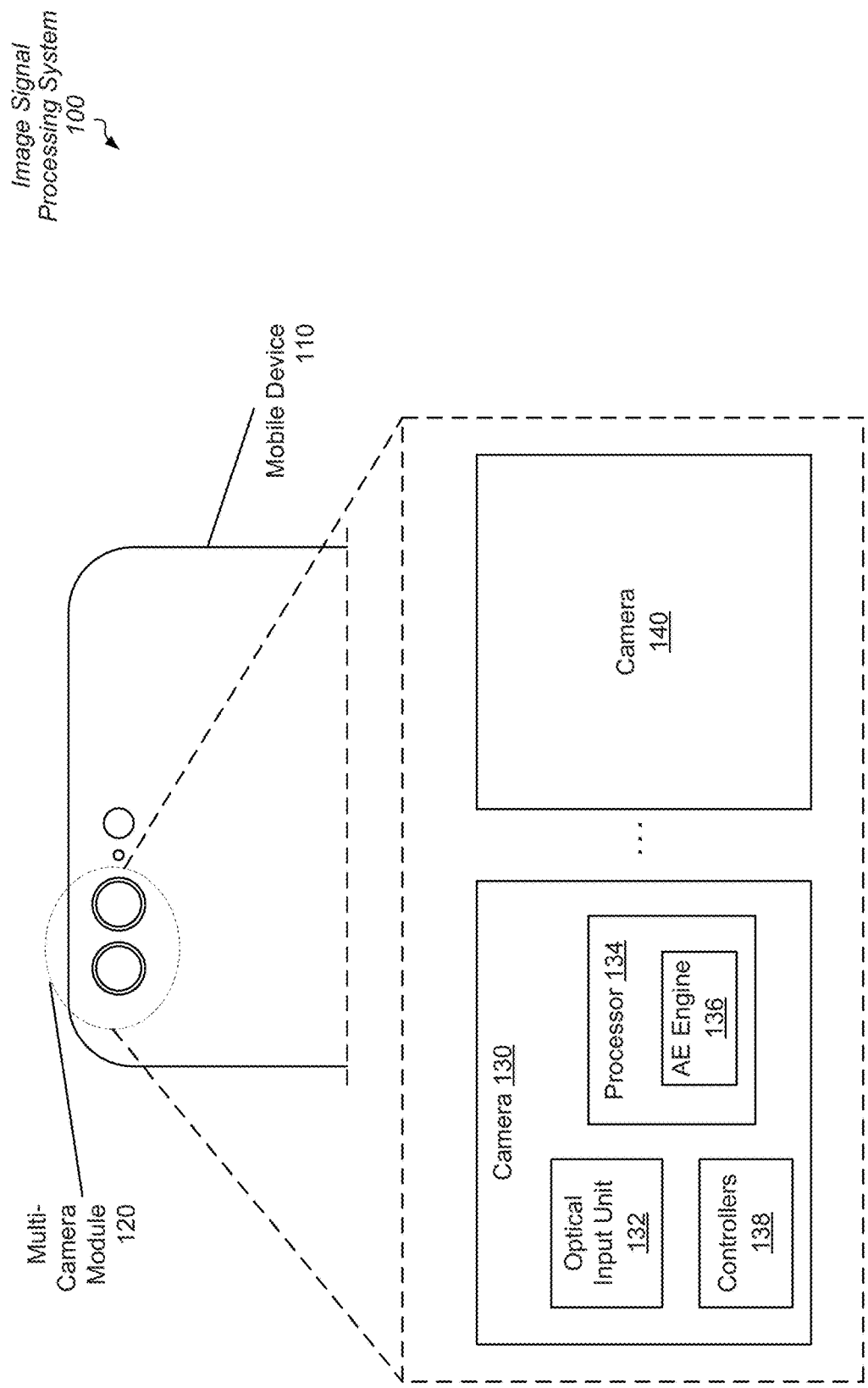
FIG. 1 is a generalized diagram of one embodiment of an image signal processing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems, an apparatus, and methods for efficiently determining a final exposure level of an image capture device are contemplated. In various embodiments, an image signal processing system of an image capturing device (or device) includes an aperture, a lens, an image sensor, and an auto exposure engine. In various embodiments, the device is one device of a multi-device module. For example, the device is a digital camera that is one of multiple digital cameras of a multi-camera module. For example, mobile devices, such as at least a smartphone or a tablet computer, use a dual camera module to capture two separate images of a same scene concurrently and combine the two images to create depth-of-field and bokeh effects. Other uses of the dual camera module include zoom, de-noising, creating depth maps, performing image fusion, creating both monochrome and color images of a same scene, and so on. A first device, which utilizes a first exposure level, receives a first amount of light corresponding to a scene. A second device, which utilizes a second exposure level different from the first exposure level, receives a second amount of light corresponding to the scene. The first device generates a first image based on the first amount of light. The second device generates a second image based on the second amount of light.

If the first device determines the first image has one of underexposure and overexposure, then the first device determines the first image includes out of range exposure. For example, the first device determines a threshold number of pixel intensity values of the first image has either a minimum pixel intensity value or a maximum pixel intensity value. When the first device determines the first image includes out of range exposure, the first device adjusts the first exposure level based on the second exposure level of the second device. Additionally, the first device adjusts the second exposure level of the second device based on the received second exposure level. Afterward, each of the first device and the second device are able to generate new images of the same scene using the updated first exposure level and updated second exposure level.

Turning to FIG. 1, a generalized diagram of one embodiment of an image signal processing system 100 is shown. As shown, the image signal processing system 100 includes a mobile device 110 with a multi-camera module 120. Although two cameras 130 and 140 are shown, in other embodiments, the multi-camera module 120 (or module 120) includes another number of cameras greater than two. The camera 130 includes at least an optical input unit 132, a processor 134, an auto exposure (AE) engine 136 and controllers 138. In some embodiments, the mobile device 110 is one of a variety of mobile computing devices such as a smartphone, a smartwatch, and a tablet computer. A screen of the mobile device 110, control buttons of the mobile device 110, a memory of the camera 130, and so on are not shown for ease of illustration.

In various embodiments, the multi-camera module 120 capture at least two separate images of a same scene concurrently and combines the two images to create depth-of-field and bokeh effects. Other uses of the multi-camera module 120 include zoom, de-noising, creating depth maps, performing image fusion, creating both monochrome and color images of a same scene, and so on. In some embodiments, the camera 140 includes the same components as camera 130. In other embodiments, the camera 140 includes more or less components than camera 130 or includes components with different capabilities than components 132-138 of camera 130. For example, in an implementation, camera 130 is a primary camera of module 120, whereas the camera 140 is a secondary camera of the module 120. Compared to the secondary camera 140, the primary camera 130 includes one or more of finer and/or faster control of an aperture, finer and/or faster control of a shutter speed, a wider angle camera lens, a telephoto camera lens, a depth sensor, and finer and/or faster control of an auto focus mechanism.

The optical input unit 132 includes an aperture that controls an amount of light that enters the camera 130 and passes through the camera lens to an image sensor. For digital cameras, the image sensor and a camera shutter are implemented together. The image sensor captures the optical input signals, such as light waves, that reflected off objects of a scene, and converts the optical input signals into electrical signals. One or more of the image sensor and an image signal processor converts the analog electrical signals into digital signals. For example, an analog-to-digital converter (ADC) converts the analog electrical signals into digital electrical signals.

The processor 134 processes the received digital data from the ADC such as calculating pixel intensity values, aiding automatic focus and automatic exposure functionalities, performing data compression and decompression, and so forth. The processor 134 sends control signals and data to one or more external components such as camera 140, other components of the mobile device 110, and peripheral devices. The auto exposure (AE) engine 136 includes hardware, such as circuitry, for executing steps that support an automatic exposure functionality. In some embodiments, the steps of an algorithm that supports automatic exposure functionality are defined by firmware, and the circuitry of the AE engine executes instructions corresponding to the steps of this algorithm. Although the AE engine 136 is shown to be included in the processor 134, in other embodiments, the AE engine 136 is a separate subcomponent such as a separate integrated circuit or processing unit.

The AE engine 136 sends indications to the controllers 138 that update parameters used to control one or more subcomponents of the optical input unit such as the aperture and one or more of the image sensor and shutter. By adjusting these parameters, the AE engine 136 controls the amount of light entering the aperture of the camera 130 and traversing through the camera lens to the image sensor of the optical input unit 132. In various embodiments, the module 120 supports automatic exposure steps and adjusting at least an exposure level of the camera 130 based on two exposure levels corresponding to the camera 130 and the camera 140. Further details are provided in the following discussion regarding the subcomponents of a camera.

Figure 2:
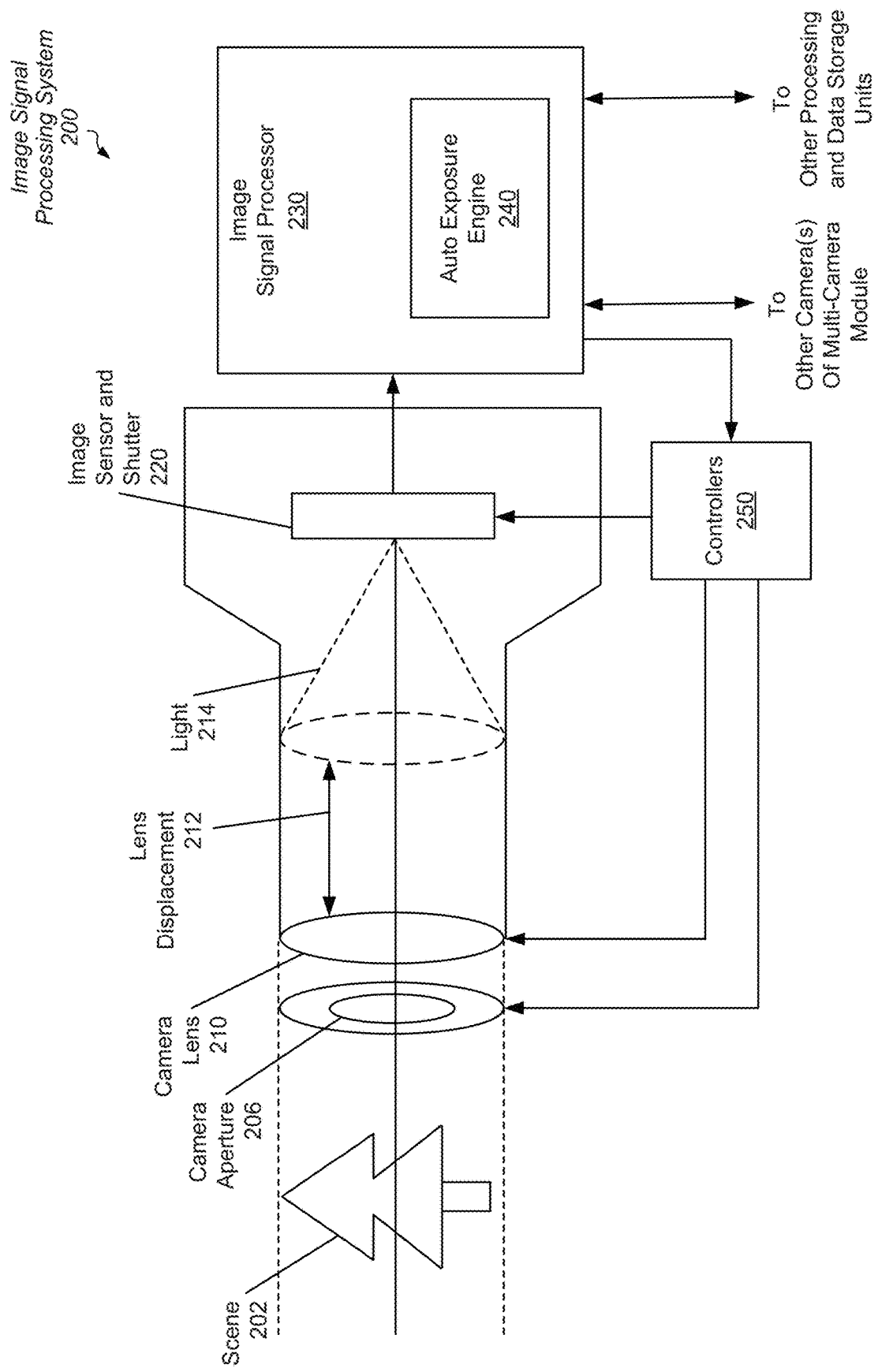
FIG. 2 is a generalized diagram of one embodiment of an image signal processing system.

Turning to FIG. 2, a generalized diagram of one embodiment of an image signal processing system 200 is shown. As shown, the image signal processing system 200 of a camera capable of performing automatic exposure includes a camera aperture 206, a camera lens 210, an image sensor 220, an image signal processor 230, an auto exposure (AE) engine 240, and controllers 250. In some embodiments, the AE engine 240 is incorporated within the image signal processor 230. In other embodiments, the AE engine 240 and the image signal processor 230 are separate components that communicate with one another.

The camera aperture 206 controls an amount of light that traverses through the camera lens 210. The wider the opening of the camera aperture 206, the more light enters the camera lens 210. The controllers 250 controls the amount of the opening of the camera aperture 206. An f-number of the image signal processing system 200 is a diameter of the camera aperture 206 divided by focal length, and it is also known as the focal ratio, f-ratio, or f-stop. The controllers 250 set the f-number for the camera aperture 206.

The image sensor 220 captures optical signals, such as light 214 (or light waves), that pass through the camera lens 210. For example, the optical signals that reflect off of one or more objects of the scene 202 are captured by the camera lens 210 through the opening of the camera aperture 206 and transmitted to the image sensor 220. The lens displacement 212 is the distance between the camera lens 210 and the image sensor 220. The controllers 250 adjusts the lens position of the camera lens 210, which adjusts the lens displacement 212.

In some embodiments, the image sensor 220 is a charge-coupled device (CCD) based on metal oxide semiconductor (MOS) capacitors. In other embodiments, the image sensor 220 is a CMOS sensor (complementary metal oxide semiconductor sensor) based on active transistors such as MOS field effect transistors (FETs). The image sensor 220 converts the optical signals into analog electrical signals. For photographic film, sensitivity of the film is referred to as film speed and is measured on a scale published by the International Organization for Standardization (ISO). "Faster" film, or more sensitive film, requires less amount of light to create an image, and has a higher ISO rating. For digital cameras, the ISO rating also indicates how sensitive is the image sensor 220 and how much light is required to create an image. However, rather than replace a type of photographic film to change the ISO rating, digital cameras amplify or reduce the electrical signals output by the image sensor 220. The controllers 250 sends an indication of an amount of amplification or reduction.

One of the many factors that contribute to capturing a detailed and clear image of the objects in the scene 202 is exposure. "Exposure" is referred to as the amount of light per unit area reaching the image sensor 220 of a digital camera. The amount of light per unit area is adjusted based on shutter speed (or exposure time) and the size of the open aperture 206 that allows light to enter the camera. The amount of light per unit area is also adjusted based on ISO sensitivity (rating), which changes the amplification of the output electrical signals of the image sensor 220. Therefore, multiple adjustments are available for adjusting exposure. These multiple adjustments include the f-number of the camera aperture 206, the ISO sensitivity/rating of the image sensor 220, and the shutter speed where the shutter incorporated within the image sensor 220.

To lighten a next image of the scene 202 after a current image of the scene 202 is found to be dark, it is possible to increase exposure by increasing the exposure time (reducing shutter speed), reducing the f-number, and/or increasing the ISO sensitivity (increasing the signal amplification of the image sensor 220). In contrast, to darken a next image of the scene 202 after a current image of the scene 202 is found to be light, it is possible to decrease exposure by decreasing the exposure time (increasing shutter speed), increasing the f-number, and/or reducing the ISO sensitivity (reducing the signal amplification of the image sensor 220).

An exposure value (EV) is a number that represents a combination of a camera's shutter speed, f-number and ISO sensitivity, such that all combinations that provide a same amount of exposure, or a same amount of light per unit area reaching the image sensor 220. There are multiple standards for the use of EV with tables representing relationships between a selected EV value and the combination of shutter speed, f-number and ISO sensitivity. Some of the standards have inverse relationships with one another. Rather than describe "exposure" using any of the standards defining EVs, as used herein, "exposure level" refers to a direct relationship with "exposure," or the amount of light per unit area reaching the image sensor 220.

In other words, increasing the exposure level of the image signal processing system 200, increases the amount of light per unit area reaching the image sensor 220. Similarly, reducing the exposure level of the image signal processing system 200, reduces the amount of light per unit area reaching the image sensor 220. Maintaining the exposure level of the image signal processing system 200, maintains the same amount of light per unit area reaching the image sensor 220. Any combination of adjustments to one or more of the shutter speed, f-number and ISO sensitivity can be used to perform the updates. In various embodiments, the AE engine 240 determines what combination of adjustments to make to adjust the exposure level of the image signal processing system 200 and sends corresponding indications to the controllers 250.

In various embodiments, the components of the image signal processing system 200 are incorporated within a camera such as the camera 130 and the camera 140 (of FIG. 1). In an embodiment, the image sensor 220 generates a first image of the scene 202 based on a first exposure level. An external camera generates a second image of the scene 202 based on a second exposure level different from the first exposure level, and the AE engine 240 receives an indication specifying the second exposure level. One or more of the image signal processor 230 and the AE engine 240 generates pixel intensity values of the first image such as a pixel histogram that relates pixel intensity values and pixel counts.

From the pixel histogram, the AE engine 240 determines a number (a count) of pixel intensity values of the first image at a maximum value. For an 8-bit representation of pixel intensity values, a maximum value is 255. Similarly, for a 10-bit representation of pixel intensity values, a maximum value is 1,023. If this number (count) exceeds a threshold, then the AE engine 240 determines the first image includes overexposure. In response, the AE engine 240 reduces each of the first exposure level and the second exposure level. The AE engine 240 sends, to the external camera, an indication specifying the reduced second exposure level. Afterward, each of the image signal processing system 200 and the external camera are able to generate new images of the scene 202 using the updated (reduced) first exposure level and updated (reduced) second exposure level. Similar steps are performed when the AE engine 240 determines the first image has underexposure.

In an embodiment, the functionality of the image signal processor 230 is performed by circuitry of a single processor, whereas, in another embodiment, the functionality of the image signal processor 230 is performed by circuitry of multiple processors. The functionality of the image signal processor 230 is representative of the functionality of one or more of a general-purpose central processing unit (CPU), a processor with a parallel data microarchitecture such as a graphics processing unit (GPU), or a digital signal processor (DSP), an application specific integrated circuit (ASIC), or other.

Figure 3:
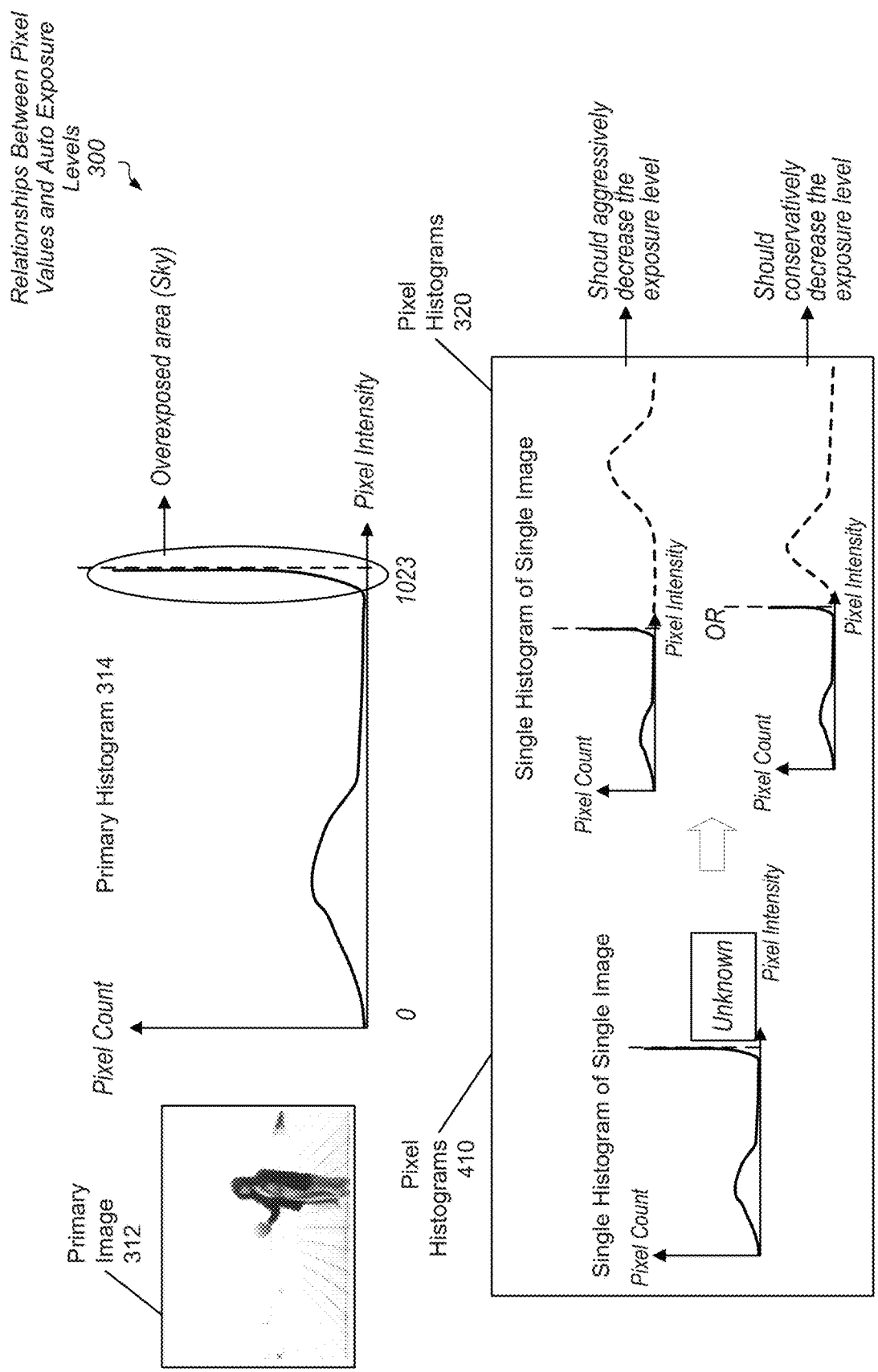
FIG. 3 is a generalized diagram of one embodiment of relationships between pixel values and auto exposure levels.

Referring to FIG. 3, a generalized diagram of relationships 300 between pixel values and auto exposure levels is shown. In the illustrated embodiment, the primary image 312 is generated by a primary image capturing device (not shown) using a primary exposure level. One of the primary image capturing device and an external processing unit, such as an image signal processor, generates the primary histogram 314 based on the pixel intensity values calculated using the primary image 312. In some embodiments, the primary image capturing device is one device of a multi-device module. The primary histogram 314 indicates calculated pixel intensity values on the x-axis and indicates pixel counts at particular pixel intensity values on the y-axis. As shown, the maximum pixel intensity value is 1,023. For a 10-bit representation of pixel intensity values, the maximum value is 1,023. In another embodiment, another size of representation and another corresponding maximum pixel intensity value is used.

The primary histogram 314 indicates a high count of pixels have the maximum pixel intensity value. The hardware of the primary device determines a count of the pixels in the primary image 312 with maximum pixel intensity value and determines whether this count exceeds a threshold. If so, then the primary image 312 has overexposure. For example, the sky in the primary image 312 is whited out. The pixel intensity values (or pixel values) of the pixels of the primary image 312 corresponding to the whited out sky have the maximum pixel value of 1,023, but the actual pixel values of these pixels are unknown. These pixels of the whited out sky are oversaturated pixels. The pixel histograms 320 show that the oversaturated pixels are unknown and could have pixel values similar to the maximum pixel value or have pixel values very dissimilar to the maximum pixel value. Therefore, selecting a next exposure level for generating a next image is difficult.

Figure 4:
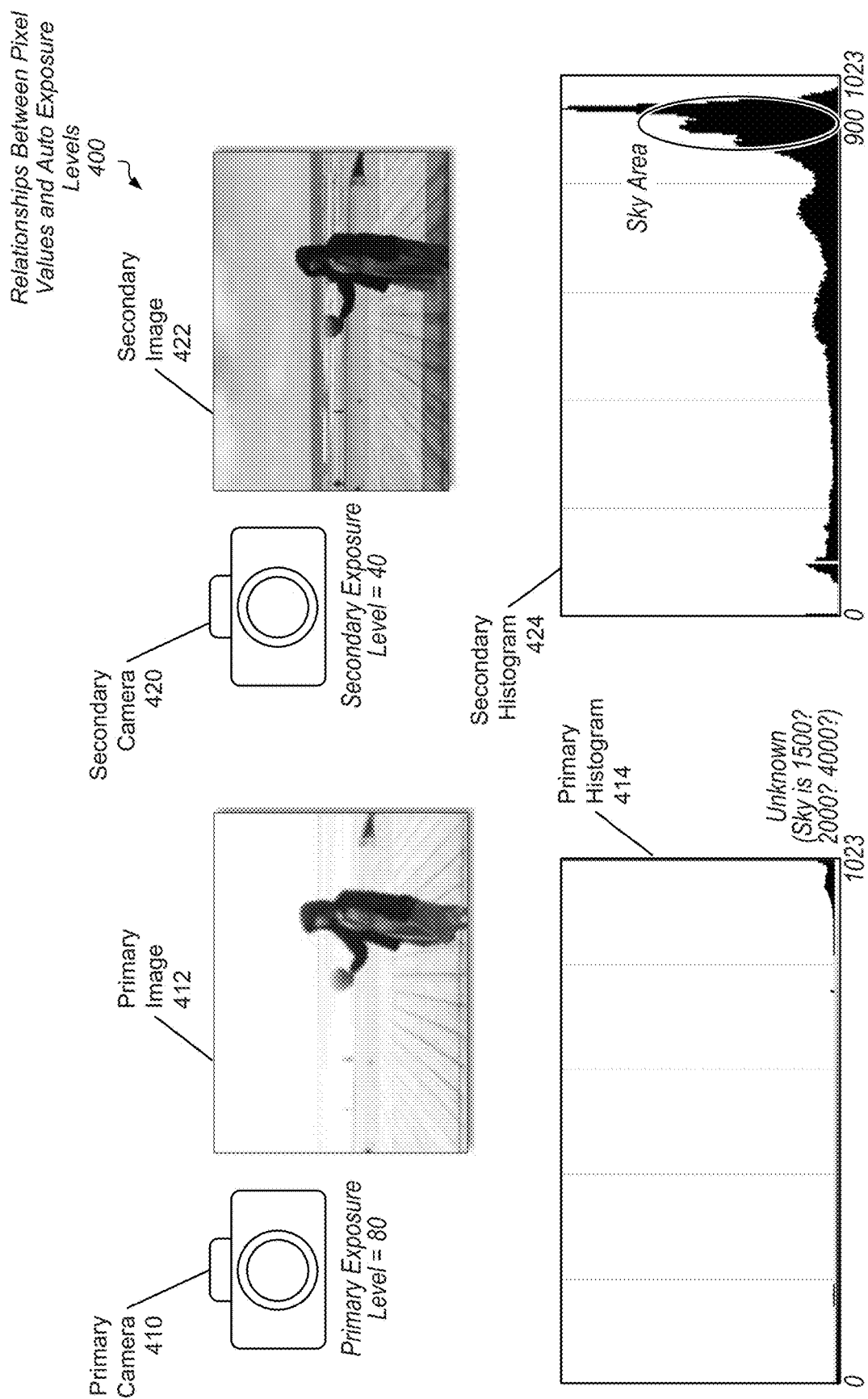
FIG. 4 is a generalized diagram of one embodiment of relationships between pixel values and auto exposure levels.

Referring to FIG. 4, a generalized diagram of relationships 400 between pixel values and auto exposure levels is shown. In the illustrated embodiment, primary camera 410 captures the primary image 412 of a scene and generates the primary histogram 414 based on the pixel intensity values calculated using the primary image 412. Similarly, secondary camera 420 captures the secondary image 422 of the same scene and generates the secondary histogram 424 based on the pixel intensity values calculated using the secondary image 422. In some embodiments, the primary camera 410 and the secondary camera 420 are two cameras of a multi-camera module of a mobile computing device. Each of the primary histogram 414 and the secondary histogram 424 indicate calculated pixel intensity values on the x-axis and indicate pixel counts at particular pixel intensity values on the y-axis. As shown, the maximum pixel intensity value is 1,023. For a 10-bit representation of pixel intensity values, the maximum value is 1,023. In another embodiment, another size of representation and another corresponding maximum pixel intensity value is used. In another example, an 8-bit representation of pixel intensity values has a range of pixel intensity values from 0 to 255 with the maximum value being 255.

In the illustrated embodiment, the secondary camera 420 captures the secondary image 422 using a secondary exposure level that is one half of the primary exposure level used by the primary camera 410 to capture the primary image 412. Although values of 80 and 40 are used to indicate the primary exposure level and the secondary exposure level, other values indicating the primary exposure level and the secondary exposure level are possible and contemplated. The primary histogram 414 indicates a high count of pixels have the maximum pixel intensity value. The hardware of the primary camera 410 determines a count of the pixels with maximum pixel intensity value and determines whether this count exceeds a threshold. If so, then the primary image 412 has overexposure. For example, the sky in the primary image 412 is whited out. However, the secondary image 412 does not have overexposure. The sky in the secondary image 422 is discernible, rather than whited out. The hardware of the primary camera performs these determining steps based on one or more of receiving an indication that data stored in a particular location is ready for evaluation, and executing particular instructions of firmware implementing steps of an algorithm.

In some embodiments, the hardware of the secondary camera 420 performs similar steps as the primary camera based on executing particular instructions in a predetermined order, and determines whether a count of pixels that have the maximum pixel intensity value exceeds a threshold. The secondary camera 420 sends an indication to the primary camera 410 specifying whether the secondary image 422 has overexposure. In some embodiments, the primary camera 410 determines the primary exposure level and the secondary exposure level, and sends an indication of the secondary level to the secondary camera 420. In yet other embodiments, the secondary camera 420 selects an initial secondary exposure level and sends an indication of this initial secondary exposure level to the primary camera 410. Afterward, the secondary camera 420 waits to receive an indication of an updated second exposure level from the primary camera 410 before capturing a next image.

Based on the results of the pixel histograms 414 and 424, the primary camera 410 updates the primary exposure level and the secondary exposure level. The primary camera 410 sends the updated value of the secondary exposure level to the secondary camera 420. In one example, the primary camera 410 determines the primary image 412 has overexposure and that a first ratio of the primary exposure level to the secondary exposure level is 80/40 or 2. In addition, the primary camera 410 receives an indication that the secondary image 422 does not have overexposure, and primary camera 410 receives an indication that the average high pixel value of the secondary image 422 is 900. Therefore, the primary camera 410 determines an oversaturated pixel value by multiplying the average high pixel value of 900 by the first ratio of 2 to obtain an oversaturated pixel value is 1,8-00. Following, the primary camera 410 determines a second ratio of the oversaturated pixel value of 1,800 to a target pixel value.

In one implementation, the target pixel value is set by the user by adjusting an exposure setting for the primary camera. For example, through a menu, another graphical user interface (GUI), or a dial and/or a button on the device that includes the primary camera and the secondary camera, the user selects an exposure setting that sets a target pixel intensity value of 1,000. In such a case, the primary camera determines the second ratio of the oversaturated pixel value to the target pixel value to be 1,800/1,000, which provides the second ratio as 1.80. Afterward, the primary camera 410 reduces each of the first exposure level and the second exposure level by dividing them by the second ratio. In this example, the primary camera 410 reduces each of the first exposure level (80) and the second exposure level (40) by dividing them by 1.80 to obtain a next first exposure level of 80/1.80, or 44.44, and a next second exposure level of 40/1.80, or 22.22.

In another example, the primary camera 410 determines the primary image 412 has overexposure, the primary camera 410 receives an indication that the secondary image 422 does not have overexposure, and the primary camera 410 receives an indication of an average high pixel value of the secondary image 422 is 900. A first ratio of the primary exposure level to the secondary exposure level is 80/40 or 2. The primary camera 410 determines an oversaturated pixel value by multiplying the average high pixel value of 900 by the first ratio of 2 to obtain an oversaturated pixel value is 1,800. Additionally, the user selects an exposure setting equivalent to a target pixel intensity value of 500, since the user wants the sky area of the image to appear darker. In such a case, the primary camera determines the second ratio of the oversaturated pixel value to the target pixel value to be 1,800/500, which provides the second ratio as 3.60. Afterward, the primary camera 410 reduces each of the first exposure level and the second exposure level by dividing them by the second ratio. In this example, the primary camera 410 reduces each of the first exposure level (80) and the second exposure level (40) by dividing them by 3.60 to obtain a next first exposure level of 80/3.60, or 22.22, and a next second exposure level of 40/1.80, or 11.11.

In a third example, the primary camera 410 determines the primary image 412 has overexposure, the primary camera 410 receives an indication that the secondary image 422 does not have overexposure, and the primary camera 410 receives an indication that an average high pixel value of the secondary image 422 is 500. Therefore, the primary camera 410 determines an oversaturated pixel value by multiplying the average high pixel value of 500 by the first ratio of 80/40, or 2, to obtain an oversaturated pixel value is 1,000. In addition, the user selects an exposure setting equivalent to a target pixel intensity value of 950, since the user wants the sky area of the image to appear bright, but not overexposed. In such a case, the primary camera determines the second ratio of the oversaturated pixel value to the target pixel value to be 1,000/950, which provides the second ratio as 1.053. Afterward, the primary camera 410 reduces each of the first exposure level and the second exposure level by dividing them by the second ratio. In this example, the primary camera 410 reduces each of the first exposure level (80) and the second exposure level (40) by dividing them by 1.053 to obtain a next first exposure level of 80/1.053, or 76.0, and a next second exposure level of 40/1.053, or 38.0.

In yet another example, while using the primary exposure level of 80 and the secondary exposure level of 40, the primary camera 410 determines the primary image 412 has overexposure, the primary camera 410 receives an indication that the secondary image 422 does not have overexposure, and the primary camera 410 receives an indication that the average high pixel value of the secondary image 422 is 900. Therefore, the primary camera 410 determines an oversaturated pixel value by multiplying the average high pixel value of 900 by the first ratio of 80/40, or 2, to obtain an oversaturated pixel value is 1,800. In this example, the user does not provide an exposure setting to use as the target pixel intensity value. In such a case, the primary camera uses a maximum pixel intensity value (e.g., 1,023) as a default value of the target pixel intensity value. In such a case, the primary camera determines the second ratio of the oversaturated pixel value to the target pixel value to be 1,800/1,023, which provides the second ratio as 1.76. Afterward, the primary camera 410 reduces each of the first exposure level and the second exposure level by dividing them by the second ratio. In this example, the primary camera 410 reduces each of the first exposure level (80) and the second exposure level (40) by dividing them by 1.76 to obtain a next first exposure level of 80/1.76, or 45.5, and a next second exposure level of 40/1.76, or 22.7.

In still yet another example, while using the primary exposure level of 80 and the secondary exposure level of 40, the primary camera 410 determines the primary image 412 has overexposure, and that, a first ratio of the primary exposure level to the secondary exposure level is 80/40 or 2. In addition, the primary camera 410 receives an indication that the secondary image 422 has overexposure. Further, the user selects an exposure setting equivalent to a target pixel intensity value of 950, since the user wants the sky area of the image to appear bright, but not overexposed. Since the secondary image 422 has overexposure, the primary camera 410 sets the next first exposure level to the current second exposure level of 40. Therefore, the primary camera 410 ensures that there is no overshooting during the next iteration of determining exposure convergence. The primary camera 410 reads, from a configuration register, a third ratio to be used when the secondary image 422 has overexposure. In an example, the third ratio is 0.40. The primary camera 410 multiplies the second exposure level of 40 by this third ratio of 0.4 to determine the next second exposure level to be 16.

Continuing with the above example, after capturing next images of the same scene with the primary camera 410 using the updated primary exposure level of 40 and the secondary camera 420 using the updated secondary exposure level of 16, the primary camera 410 determines the primary image 412 has overexposure, the primary camera 410 receives an indication that the secondary image 422 does not have overexposure, and the primary camera 410 receives an indication that the average high pixel value of the secondary image 422 is 900. Therefore, the primary camera 410 determines an oversaturated pixel value by multiplying the average high pixel value of 900 by the first ratio of 40/16, or 2.5, to obtain an oversaturated pixel value is 2,250. Since the user selected an exposure setting equivalent to a target pixel intensity value of 950, the primary camera determines the second ratio of the oversaturated pixel value to the target pixel value to be 2,250/950, which provides the second ratio as 2.368. Afterward, the primary camera 410 reduces each of the first exposure level and the second exposure level by dividing them by the second ratio. In this example, the primary camera 410 reduces each of the first exposure level (40) and the second exposure level (16) by dividing them by 2.368 to obtain a next first exposure level of 40/2.368, or 16.89, and a next second exposure level of 16/2.368, or 6.76.

In some embodiments, the primary camera 410 purposely stalls exposure convergence in order to tradeoff speed for smoothness of the exposure convergence for the user. For example, despite calculating an updated first exposure level of 16.89 and an updated second exposure level of 6.76, the primary camera 410 instead selects a primary exposure level of 30 and a second exposure level of 20. The selection of intermediate exposure levels between the current exposure levels and the calculated next exposure levels is based on a tuning parameter and a tuning rate stored in configuration registers.

Figure 5:
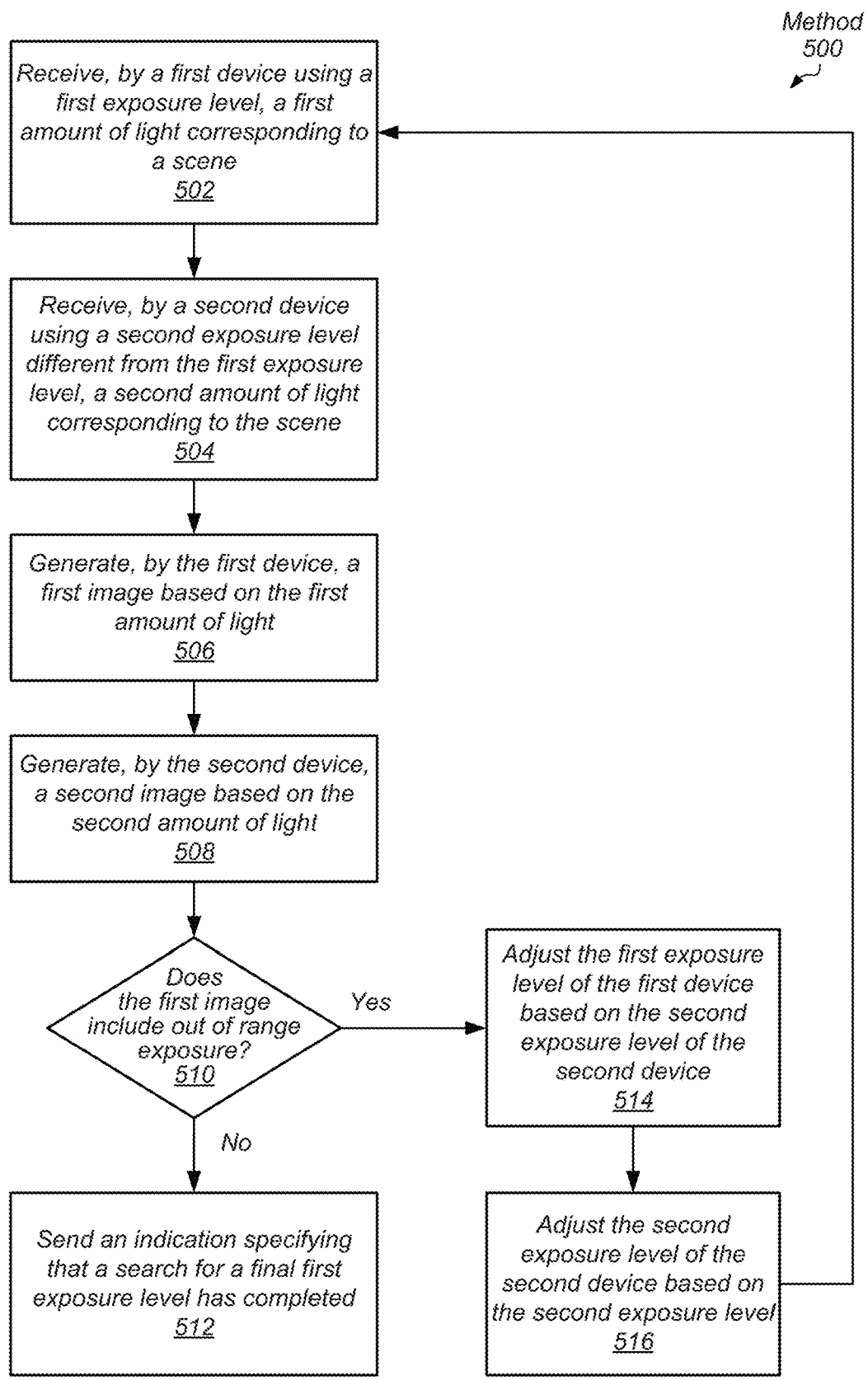
FIG. 5 is a generalized diagram of one embodiment of a method for efficiently determining a final exposure level of an image capture device.

Referring now to FIG. 5, one embodiment of a method 500 for efficiently determining a final exposure level of an image capture device is shown. For purposes of discussion, the steps in this embodiment (as well as in FIGS. 6-8) are shown in sequential order. However, in other embodiments some steps occur in a different order than shown, some steps are performed concurrently, some steps are combined with other steps, and some steps are absent.

A first device, which utilizes a first exposure level, receives a first amount of light corresponding to a scene (block 502). A second device, which utilizes a second exposure level different from the first exposure level, receives a second amount of light corresponding to the scene (block 504). In various implementations, each of the first device and the device is an image capture device. In some embodiments, the first device and the second device are separate cameras of a multi-camera module. The first device generates a first image based on the first amount of light (block 506). The second device generates a second image based on the second amount of light (block 508). In some implementations, an auto exposure engine separate from the first device and the second device processes data and updates one or more of the first exposure level and the second exposure level. In other implementations, the functionality of the auto exposure engine resides within one of the first device and the second device. The auto exposure engine determines whether the first image includes out of range exposure.

If the auto exposure engine determines the first image has one of underexposure and overexposure, then the auto exposure engine determines the first image includes out of range exposure. For example, the auto exposure engine determines a threshold number of pixel intensity values of the first image has either a minimum pixel intensity value or a maximum pixel intensity value. If the auto exposure engine determines the first image does not include out of range exposure ("no" branch of the conditional block 510), then the auto exposure engine sends an indication specifying that a search for a final first exposure level has completed (block 512). In an implementation, the auto exposure engine sends the indication to an image signal processor. If the auto exposure engine determines the first image includes out of range exposure ("yes" branch of the conditional block 510), then the auto exposure engine adjusts the first exposure level of the first device based on the second exposure level of the second device (block 514). Additionally, the auto exposure engine adjusts the second exposure level of the second device based on the second exposure level (block 516).

Figure 6:
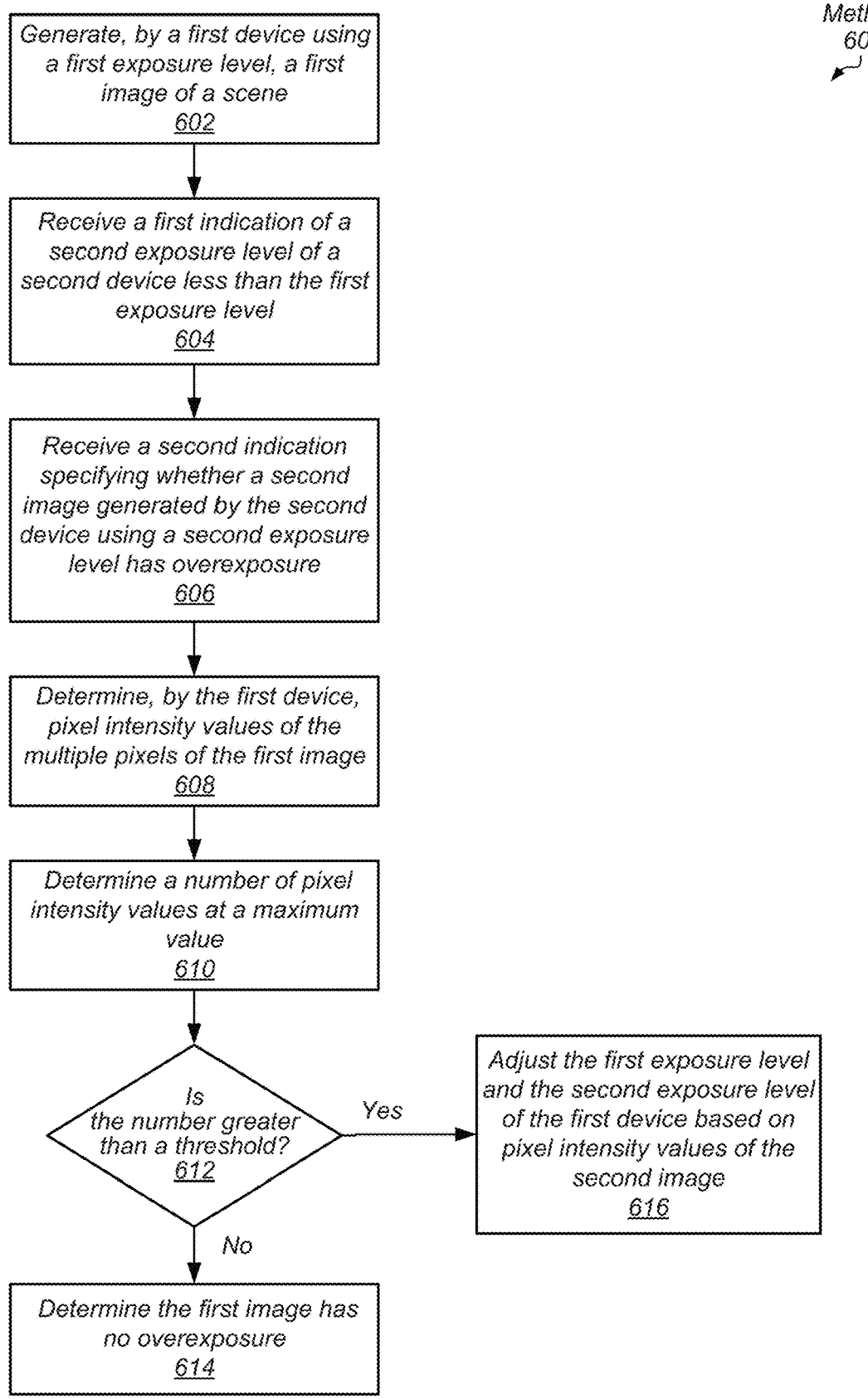
FIG. 6 is a generalized diagram of one embodiment of a method for efficiently determining a final exposure level of an image capture device.

Turning to FIG. 6, one embodiment of a method 600 for efficiently determining a final exposure level of an image capture device is shown. A first device, which utilizes a first exposure level, generates a first image of a scene (block 602). In some embodiments, the first device is a camera of a multi-camera module, and a second device is another camera of the multi-camera module that generates a second image of the same scene. Although it is described that the first device performs the following steps, in other embodiments, an external engine, such as an auto exposure engine or an image signal processor, performs the steps. The first device receives a first indication of a second exposure level of the second device, and the second exposure level is less than the first exposure level (block 604). In some implementations, the first device reads the first indication from data storage, since the first device had earlier set each of the first exposure level and the second exposure level. The first device receives a second indication specifying whether a second image generated by the second device using a second exposure level has overexposure (block 606).

The first device determines pixel intensity values of the multiple pixels of the first image (block 608). For example, the first device generates a pixel histogram based on the first image. The first device determines a number (a count) of pixel intensity values at a maximum value (block 610). If the first device determines that the number is less than or equal to a threshold ("no" branch of the conditional block 612), then the first device determines that there is the first image has no overexposure (block 614). However, if the first device determines that the number is greater than the threshold ("yes" branch of the conditional block 612), then the first device determines that the first image has overexposure and the first device adjusts the first exposure level and the second exposure level of the first device based on pixel intensity values of the second image (block 616).

Figure 7:
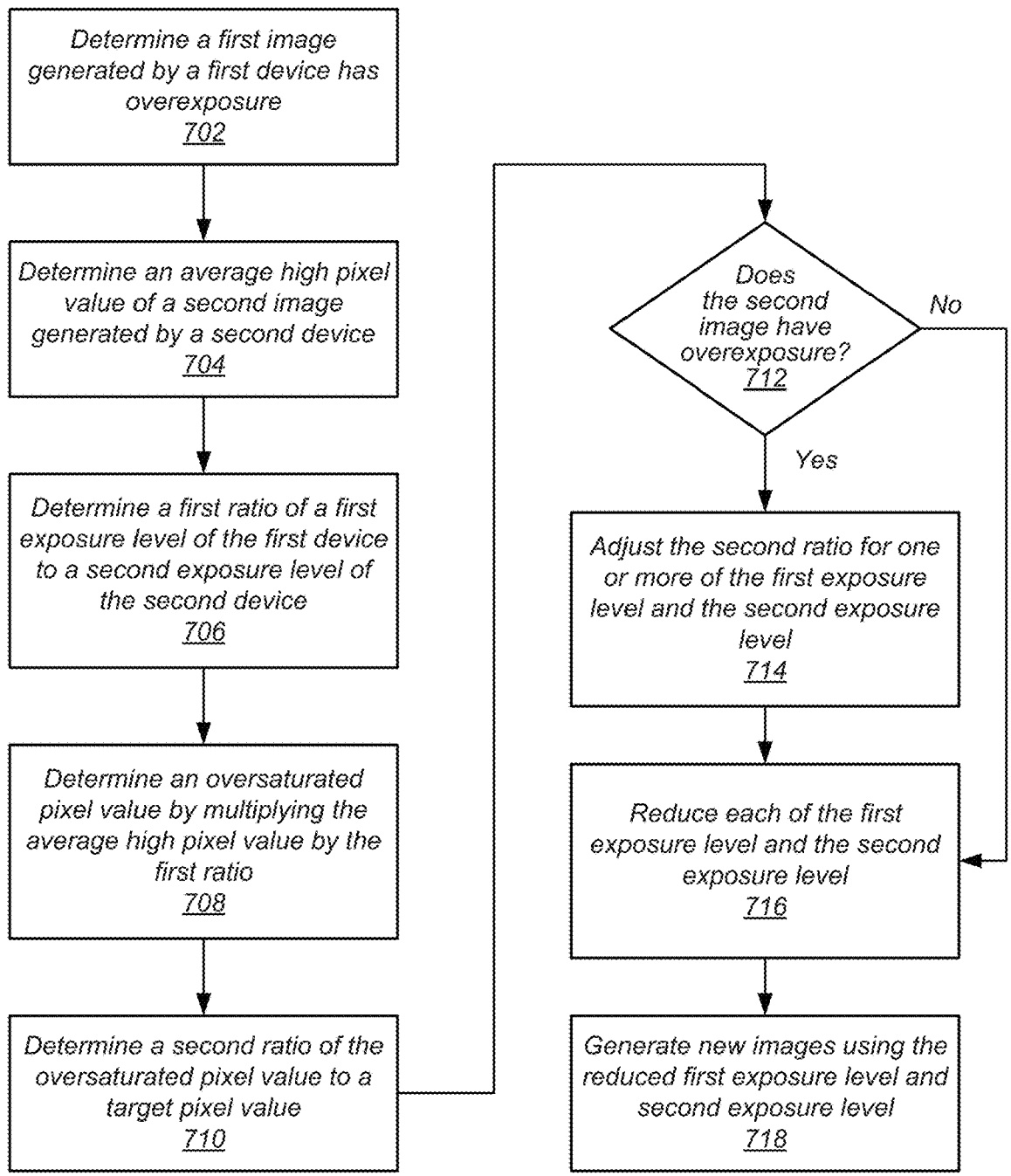
FIG. 7 is a generalized diagram of one embodiment of a method for efficiently determining a final exposure level of an image capture device.

Turning to FIG. 7, one embodiment of a method 700 for efficiently determining a final exposure level of an image capture device is shown. Although it is described that the first device performs the following steps, in other embodiments, an external engine, such as an auto exposure engine or an image signal processor, performs the steps. A first device determines a first image generated by the first device has overexposure (block 702). In some embodiments, the first device is an image capturing device such as a camera of a multi-camera module. The first device generated a pixel histogram based on the first image and compared a count of pixels with maximum pixel values to a threshold to determine whether the first image has overexposure. A second device determines an average high pixel value of a second image generated by the second device (block 704).

In an embodiment, the second device is another camera in the multi-camera module. In some implementations, the second device generates a pixel histogram based on a second image generated by the second device. The second device selects the average high pixel value as a pixel value on the x-axis of the pixel histogram that coincides with a 5 percent reduction in total pixel count from the highest pixel value. In one example, pixel values are represented as 10 bit values, so the range of pixel values is 0 being the minimum pixel value to 1,023 being the maximum pixel value. However, the second image may not have any pixels with the maximum pixel value. Rather, the highest pixel value of the second image may be 1,018. In this example, the second device is a camera that captures 1,600×1,200 pixels and generates the second image with a resolution of 1.92 million pixels. Therefore, the second device is a 2.0 megapixel camera.

Five percent of 1.92 million pixels is 96,000 pixels. In this example, the second device selects the average high pixel value as the pixel value on the x-axis of the histogram with a sum of approximately 96,000 pixels to its right on the pixel histogram. If that pixel value on the x-axis is 900, then the second device selects the pixel value of 900 as the average high pixel value of the second image. In other implementations, the second device selects the average high pixel value of the second image using one of a variety of other methods including using averages, standard deviations, and so forth.

The first device determines a first ratio of a first exposure level of the first device to a second exposure level of the second device (block 706). For example, the first device divides the first exposure level by the second exposure level to determine the first ratio. In one example, the first exposure level is 80 and the second exposure level is 40, so the first ratio is 80/40, or 2. The first device determines an oversaturated pixel value by multiplying the average high pixel value by the first ratio (block 708). In this example, the first device multiplies the average high pixel value of 900 by the first ratio of 2 to determine the oversaturated pixel value is 1,800. The first device determines a second ratio of the oversaturated pixel value to a target pixel value (block 710). In this example, the first device divides the oversaturated pixel value of 1,800 by a target pixel value. As described earlier, through a menu, another graphical user interface (GUI), or a dial and/or a button on the device that includes the primary camera and the secondary camera, the user selects an exposure setting that sets a target pixel intensity value of 1,000. In such a case, the primary camera determines the second ratio of the oversaturated pixel value to the target pixel value to be 1,800/1,000, which provides the second ratio as 1.80.

In some embodiments, the second device or another external processing unit sends an indication to the first device specifying whether the second image generated by the second device has overexposure. If the first device determines the second image has overexposure ("yes" branch of the conditional branch 712), then the first device adjusts the second ratio for one or more of the first exposure level and the second exposure level (block 720). As described earlier regarding the relationships 400 (of FIG. 4), in an embodiment, since the secondary image has overexposure, the first device reads, from a configuration register, a third ratio to be used when the secondary image has overexposure. In an example, the third ratio is 0.40. Afterward, the first device reduces each of the first exposure level and the second exposure level (block 716). In one example, the first device sets the next first exposure level to the current second exposure level of 40. Therefore, the first device ensures that there is no overshooting during the next iteration of determining exposure convergence. The first device also multiplies the second exposure level by this third ratio of 0.4 to determine the next second exposure level of 16.

If the first device determines the second image does not have overexposure ("no" branch of the conditional branch 712), then the control flow of method 700 skips block 714 and moves to block 716 where the first device reduces each of the first exposure level and the second exposure level. In some embodiments, the first device reduces each of the first exposure level and the second exposure level by dividing them by the second ratio. In this example, the primary camera 410 reduces each of the first exposure level (80) and the second exposure level (40) by dividing them by 1.80 to obtain a next first exposure level of 80/1.80, or 44.44, and a next second exposure level of 40/1.80, or 22.22. Afterward, the first device and the second device generate new images using the reduced first exposure level and second exposure level (block 718).

Figure 8:
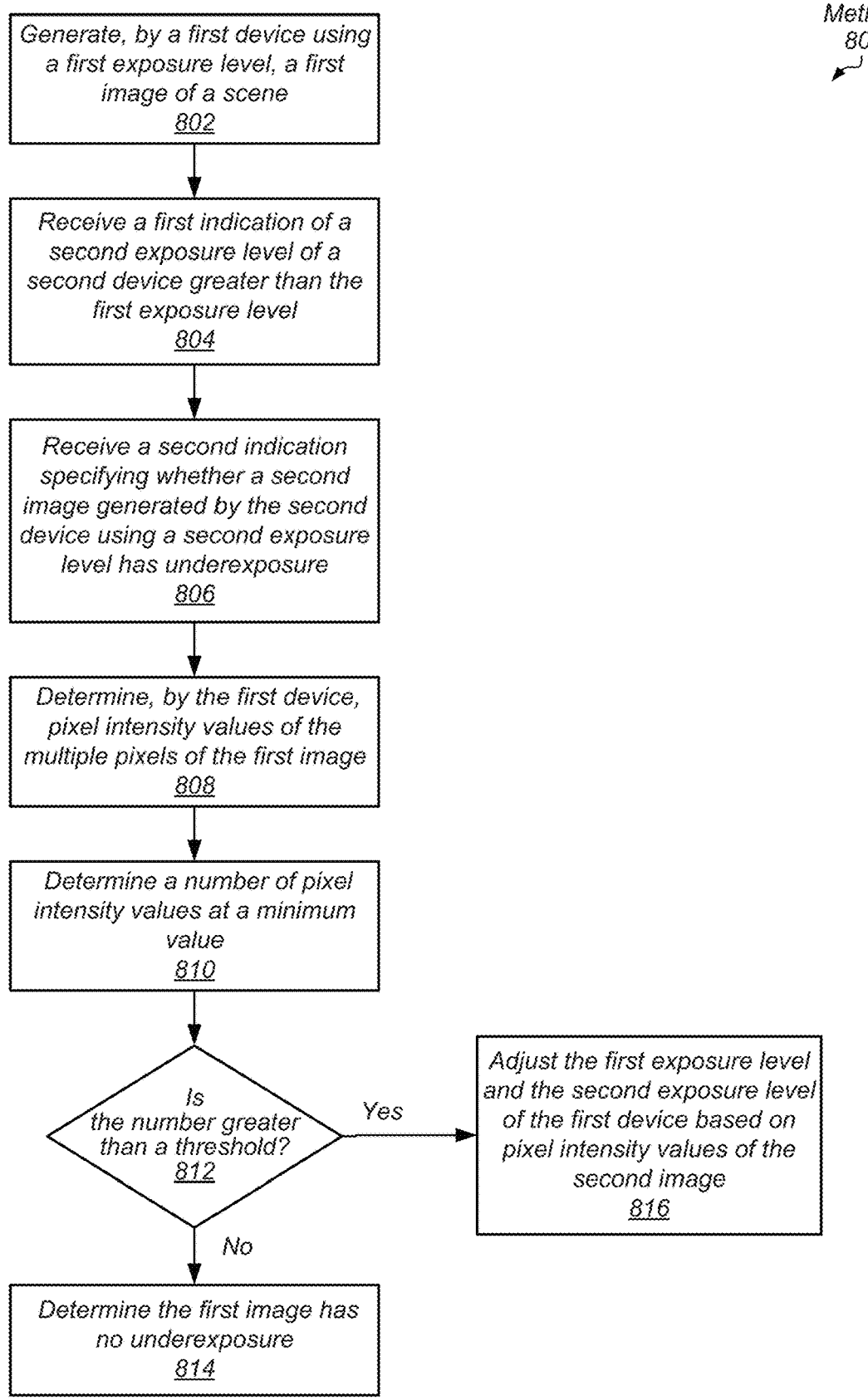
FIG. 8 is a generalized diagram of one embodiment of a method for efficiently determining a final exposure level of an image capture device.

Turning to FIG. 8, one embodiment of a method 800 for efficiently determining a final exposure level of an image capture device is shown. A first device, which utilizes a first exposure level, generates a first image of a scene (block 802). In some embodiments, the first device is a camera of a multi-camera module, and a second device is another camera of the multi-camera module that generates a second image of the same scene. Although it is described that the first device performs the following steps, in other embodiments, an external engine, such as an auto exposure engine or an image signal processor, performs the steps. The first device receives a first indication of a second exposure level of the second device, and the second exposure level is greater than the first exposure level (block 804). In some implementations, the first device reads the first indication from data storage, since the first device had earlier set each of the first exposure level and the second exposure level. The first device receives a second indication specifying whether a second image generated by the second device using a second exposure level has underexposure (block 806).

The first device determines pixel intensity values of the multiple pixels of the first image (block 808). For example, the first device generates a pixel histogram based on the first image. The first device determines a number (a count) of pixel intensity values at a minimum value (block 810). If the first device determines that the number is less than or equal to a threshold ("no" branch of the conditional block 812), then the first device determines that there is the first image has no underexposure (block 814). However, if the first device determines that the number is greater than the threshold ("yes" branch of the conditional block 812), then the first device determines that the first image has underexposure and the first device adjusts the first exposure level and the second exposure level of the first device based on pixel intensity values of the second image (block 816). In various embodiments, the first device uses steps similar to the steps described in FIG. 7 for method 700. However, the steps are adjusted for finding an average low pixel value, an undersaturated pixel value, a minimum limit pixel value, and reducing the second ratio while increasing the first exposure level and the second exposure level for possibly generating next images by the first device and the second device.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
    circuitry configured to:
        receive a first exposure level utilized by a first camera to generate a first image of a scene;
        receive a second exposure level different from the first exposure level utilized by a second camera to generate a second image of the scene;
        determine a first ratio of the first exposure level to the second exposure level; and
        adjust the first exposure level of the first camera based on the first ratio, in response to detecting the first image includes out of range exposure.

2. The apparatus as recited in claim 1, wherein the circuitry is further configured to adjust the second exposure level based on the first ratio.

3. The apparatus as recited in claim 1, wherein
    the second exposure level is less than the first exposure level.

4. The apparatus as recited in claim 3, wherein the circuitry is further configured to determine an oversaturated pixel value by multiplying a given pixel value of the second image by the first ratio.

5. The apparatus as recited in claim 4, wherein the circuitry is further configured to determine a second ratio of the oversaturated pixel value to a maximum limit pixel value.

6. The apparatus as recited in claim 5, wherein the circuitry is further configured to adjust the first exposure level based on the second ratio.

7. A method comprising:
- generating, by a first camera, a first image of a scene utilizing a first exposure level;
- generating, by a second camera, a second image of the scene utilizing a second exposure level different from the first exposure level; and
- determining a first ratio of the first exposure level to the second exposure level; and
- adjusting, by an auto exposure engine, the first exposure level of the first camera based on the first ratio, in response to detecting the first image includes out of range exposure.

8. The method as recited in claim 7, further comprising adjusting the second exposure level of the second camera based on the first ratio.

9. The method as recited in claim 7, wherein the second exposure level is less than the first exposure level.

10. The method as recited in claim 7, further comprising determining an oversaturated pixel value by multiplying a given pixel value of the second image by the first ratio.

11. The method as recited in claim 7, further comprising determining a second ratio of the oversaturated pixel value to a maximum limit pixel value.

12. The method as recited in claim 11, further comprising determining an average high pixel level of the second image.

13. A circuit comprising:
- a first camera configured to generate a first image of a scene utilizing a first exposure level;
- a second camera configured to generate a second image of the scene utilizing a second exposure level different from the first exposure level; and
- circuitry configured to adjust the first exposure level of the first camera based on an oversaturated pixel value level of the second image, in response to detecting the first image includes out of range exposure.

14. The circuit as recited in claim 13, wherein the circuitry is further configured to adjust the second exposure level of the second camera based on the first ratio.

15. The circuit as recited in claim 13, wherein the circuitry is configured to determine the oversaturated pixel level based at least in part on a ratio of the first exposure level to the second exposure level.

16. The circuit as recited in claim 13, wherein the second exposure level is less than the first exposure level.

17. The circuit as recited in claim 16, wherein the circuitry is further configured to determine an oversaturated pixel value by multiplying a given pixel value of the second image by the first ratio.

18. The circuit as recited in claim 17, wherein the circuitry is further configured to determine a second ratio of the oversaturated pixel value to a maximum limit pixel value.

19. The circuit as recited in claim 18, wherein the circuitry is further configured to increase the second ratio, in response to determining the second image includes overexposure.

20. The circuit as recited in claim 18, wherein the circuitry is further configured to:
- reduce each of the first exposure level and the second exposure level based on the second ratio; and
- send the reduced first exposure level to the first camera and the reduced second exposure level to the second camera.

* * * * *